United States Patent
Kramlich et al.

(10) Patent No.: US 8,138,866 B2
(45) Date of Patent: Mar. 20, 2012

(54) ROTARY ACTUATOR WITH MAGNETICALLY GENERATED HAPTICS

(75) Inventors: Andreas Kramlich, Schweinfurt (DE); Dieter Weth, Bad Neustadt a.d. Saale (DE)

(73) Assignee: Preh GmbH (DE)

( * ) Notice: Subject to any disclaimer, the term of this patent is extended or adjusted under 35 U.S.C. 154(b) by 112 days.

(21) Appl. No.: 12/433,455

(22) Filed: Apr. 30, 2009

(65) Prior Publication Data

US 2009/0273423 A1 Nov. 5, 2009

Related U.S. Application Data

(63) Continuation of application No. PCT/EP2007/009114, filed on Oct. 20, 2007.

(30) Foreign Application Priority Data

Oct. 16, 2007 (DE) ...................... 10 2007 002 189.7

(51) Int. Cl.
*H01H 9/00* (2006.01)
*G06F 3/033* (2006.01)

(52) U.S. Cl. ........ 335/207; 335/114; 335/153; 335/205; 335/288; 335/302; 200/318; 700/85; 345/184

(58) Field of Classification Search .................. 335/114, 335/125, 153, 179, 205–207, 229, 285, 288, 335/302; 200/43.11, 43.16, 318, 320; 700/56, 700/65, 83, 85; 345/701, 702, 156, 157, 345/184

See application file for complete search history.

(56) References Cited

U.S. PATENT DOCUMENTS

| | | | | |
|---|---|---|---|---|
| 2,498,683 | A | * | 2/1950 | Hubbell ........................ 200/571 |
| 2,521,723 | A | * | 9/1950 | Hubbell ........................ 335/207 |
| 3,209,097 | A | * | 9/1965 | Shlesinger, Jr. ............... 335/207 |
| 3,317,870 | A | * | 5/1967 | Bear .............................. 335/207 |
| 3,681,727 | A | * | 8/1972 | Hallmann ...................... 335/253 |
| 4,027,278 | A | * | 5/1977 | Giannini ....................... 335/154 |
| 4,055,824 | A | * | 10/1977 | Baermann ..................... 335/288 |
| 4,199,741 | A | * | 4/1980 | Serrus Paulet ............... 335/206 |
| 4,318,095 | A | * | 3/1982 | Fukuoka ....................... 345/184 |
| 4,868,530 | A | * | 9/1989 | Ahs ............................... 335/207 |
| 6,480,752 | B1 | * | 11/2002 | Blume et al. .................... 700/56 |
| 2004/0094393 | A1 | | 5/2004 | Lalonde et al. |
| 2009/0021333 | A1 | * | 1/2009 | Fiedler .......................... 335/285 |
| 2009/0125024 | A1 | * | 5/2009 | Baur .............................. 606/42 |

FOREIGN PATENT DOCUMENTS

| DE | 70 21 087 U | 9/1970 |
|---|---|---|
| DE | 90 03 955 U1 | 6/1990 |
| DE | 197 12 049 A1 | 9/1998 |
| FR | 2 370 350 A | 6/1978 |

* cited by examiner

*Primary Examiner* — Mohamad Musleh
(74) *Attorney, Agent, or Firm* — Cantor Colburn LLP

(57) ABSTRACT

A rotary actuator with a magnetically produced tactile sense is provided, in particular for a motor vehicle. The rotary actuator includes two plane-parallel permanent magnets, with the first magnet being arranged in a fixed position in a housing of the rotary actuator, and in which case the second magnet can be rotated with respect to the first magnet by a handle of the rotary actuator.

5 Claims, 2 Drawing Sheets

ROTARY ACTUATOR WITH MAGNETICALLY GENERATED HAPTICS

This nonprovisional application is a continuation of International Application No. PCT/EP2007/009114, which was filed on Oct. 20, 2007, and which claims priority to German Patent Application Nos. DE 102006051869.1 and DE 102007002189.7, which were filed in Germany on Oct. 31, 2006 and Jan. 16, 2007, respectively, and which are all herein incorporated by reference.

BACKGROUND OF THE INVENTION

1. Field of the Invention

The present invention relates to a rotary actuator with magnetically generated haptics, in particular for an automotive vehicle.

2. Description of the Background Art

Operating elements having a rotatable handle, which are referred to as rotary actuators, are widely used, in particular for controlling an onboard computer or any other function of an automotive vehicle. It is thereby desirable for the user to have a haptic feedback of the change in the rotational position of the handle, such as in the form of rotation detents.

SUMMARY OF THE INVENTION

It is therefore an object of the present invention to provide a rotary actuator with haptic feedback that is of a simple construction and subject to minimal wear.

A rotary actuator with magnetically generated haptics, according to an embodiment, can include two plane parallel permanent magnets, the first magnet being disposed stationary in a housing of the rotary actuator and the second magnet being rotatable with respect to the first magnet by means of a handle of the rotary actuator.

The magnetic force between the two permanent magnets causes the two magnets to be in a stable equilibrium position with respect to each other when the handle is not operated. If the second magnet is rotated by means of the handle, the force between the magnets results in a restoring force being exerted onto the handle. From a certain relative rotation between the magnets, for example, a 90° rotation, the restoring force back into the previously mentioned stable position is overcome and the force between the magnets is such that it brings the magnets into a second stable equilibrium position. The thus generated force gradient against the angle of rotation delivers a haptic feedback to the user of the rotary actuator.

The permanent magnets can include two layers of different magnetic polarity, the thickness of the layers being smaller than the side lengths of the base of the layers.

One pole of every single magnet can be permanently turned toward the other magnet. Accordingly, the rotation of the second magnet occurs about an axis that is perpendicular to the bases of the magnets. Therefore, the permanent magnets remain plane parallel even when the second magnet is caused to rotate.

In an embodiment of the invention, there can be a constant air gap between the permanent magnets. Accordingly, the plane parallel surfaces, which are turned toward each other, of the two magnets are always spaced the same distance apart. The force gradient against the angle of rotation of the handle can be adjusted by choosing this distance.

In an embodiment of the invention, the second magnet can be non-rotatably linked to the handle of the rotary actuator. The angle of rotation of the handle thus corresponds to the angle of relative rotation between the two permanent magnets. Complete 360° rotation of the handle results in two stable equilibrium positions of the magnets with respect to each other and thus in two detent points.

In an alternative embodiment, the second magnet can be connected to the handle of the rotary actuator through a gear. The ratio angle of rotation of the handle to angle of relative rotation between the two permanent magnets is adjustable through the gear. The number of detents can be fixed by means of the transmission ratio of the gear when the handle is caused to perform one complete revolution.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
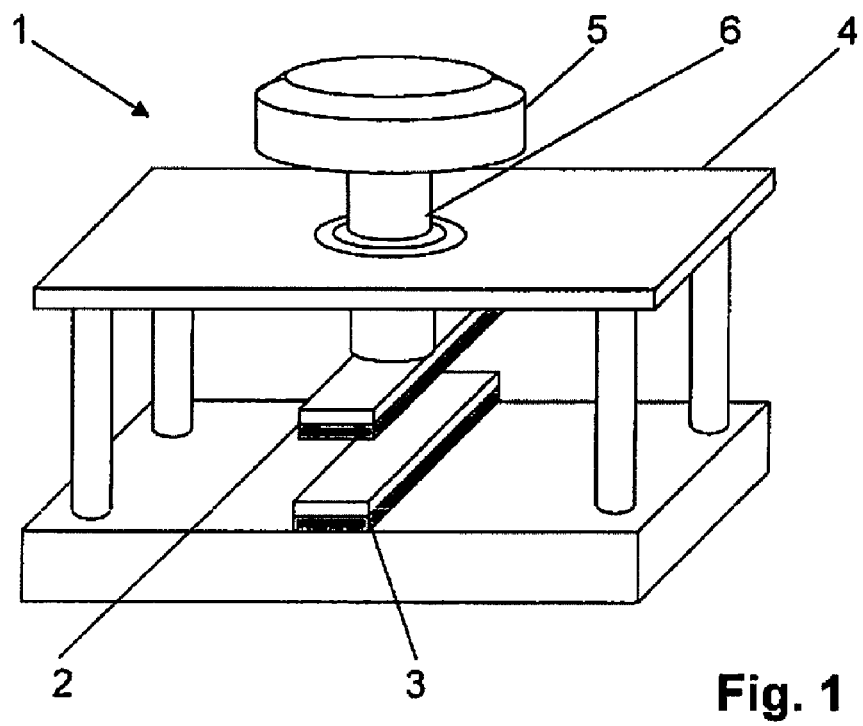
FIG. 1 shows a rotary actuator with a permanent magnet mounted on the rotating shaft.

FIG. 1 shows a rotary actuator 1 with a housing 4. A first permanent magnet 3 is disposed stationary in the housing 4. A second permanent magnet 2 is non-rotatably linked to a rotating shaft 6. The handle 5 is also non-rotatably linked to the rotating shaft 6. The north poles of the magnets 2 and 3 are coloured in grey, the south poles are shown in white. Each magnet pole is planar.

In the stable equilibrium position shown in FIG. 1, the magnets 2 and 3 have the same orientation. The north pole of the magnet 2 faces the south pole of magnet 3. If magnet 2 is rotated out of this position by means of the handle 5, the force between the magnets 2 and 3 causes a restoring force into the position of magnet 2 shown in FIG. 1 and as a result thereof of the handle 5. If magnet 2 is rotated 90° relative to magnet 3, the restoring force is overcome and magnet 2 heads for a second stable equilibrium position in which it is rotated 180° with respect to the position shown in FIG. 1. Accordingly, up to an angle of relative rotation of 90°, a force must be overcome, from an angle of rotation of 90° the magnet 2 and, as a result thereof, the handle 5, is brought into a second stable equilibrium position by virtue of the magnetic force. This force gradient can be felt by the operator of the rotary actuator 1 as a haptic feedback in the form of a detent.

Figure 2:
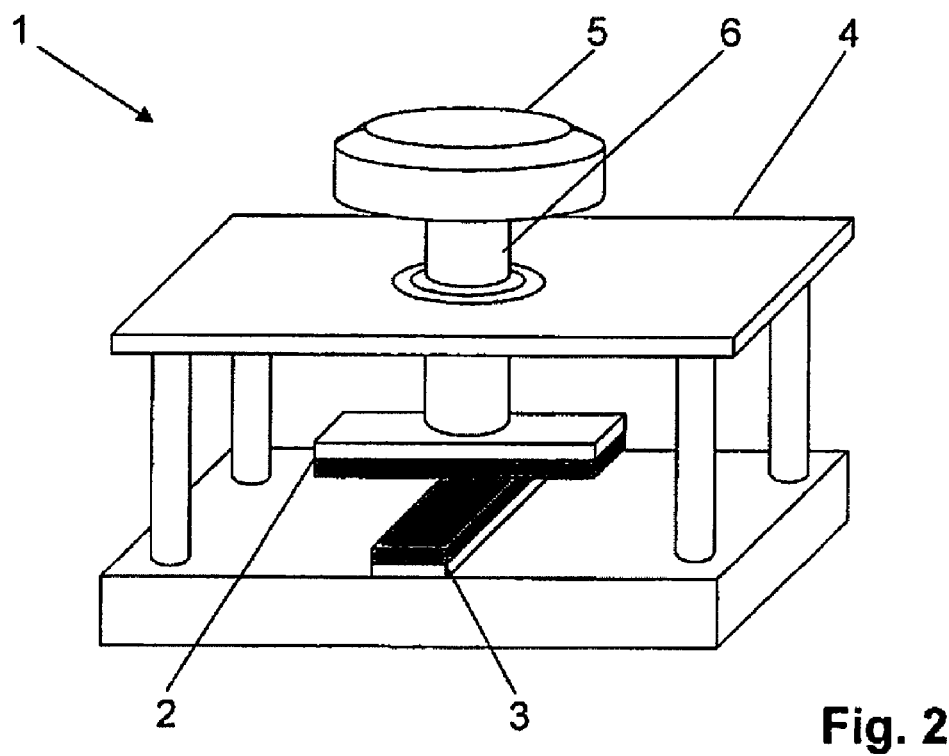
FIG. 2 shows another rotary actuator with permanent magnets mounted on the rotating shaft.

FIG. 2 shows another rotary actuator that differs from the rotary actuator shown in FIG. 1 in that the same poles of the magnets 2 and 3 are turned toward each other, in the present case this being the north poles. Since the rotary actuators are of the same construction, like elements are labelled with the same numerals as in FIG. 1.

Since two like poles of the permanent magnets 2 and 3 are facing each other, the magnet 2 and, as a result thereof, the handle 5 are in a stable position if the magnets 2 and 3 are at a right angle to each other, as shown in FIG. 2. Otherwise, the functioning is the same as that of the rotary actuator shown in FIG. 1. In addition thereto, the embodiment shown in FIG. 2 has a push functionality. If the handle 5 is pushed toward the rotating shaft 6, the magnets 2 and 3 move toward each other and the air gap between them becomes smaller. Since like magnet poles repel, a magnetically generated counterforce opposes the pushing force.

Figure 3:
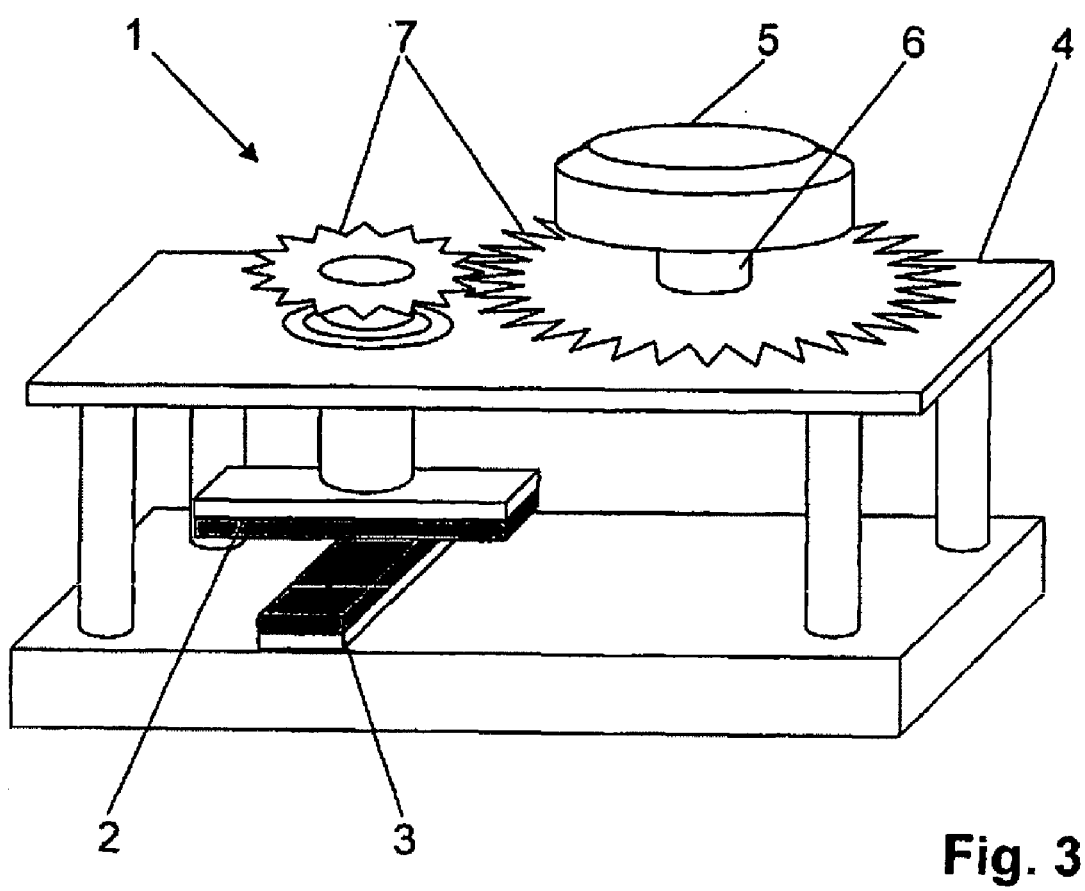
FIG. 3 shows a rotary actuator with a gear between the rotating shaft and the rotatable magnet.

FIG. 3 shows another rotary actuator, the permanent magnet 2 of which is not directly non-rotatably linked to the rotating shaft 6 of the handle 5 but through a gear 7. The gear 7 generates a mechanical transmission of, for example, a ratio 1:2, however other ratios are also possible. This means that magnet 2 is caused to rotate with respect to magnet 3 at an angle of rotation that is double the angle of rotation the handle 5 is caused to rotate. As a result, when the handle 5 is caused to perform a complete revolution, it does not pass through two detents like in the rotary actuators shown in the FIGS. 1 and 2, but through four. For each complete revolution of the handle 5, any number of detents can be generated by choosing the transmission ratio of the gear 7.

The restoring force of the magnets 2 and 3 back into the stable equilibrium positions is transmitted to the handle 5 through the gear 7 and can be perceived by the operator of the rotary actuator 1. Since in the rotary actuator 1 shown in FIG. 3 like poles of the magnets 2 and 3 are facing each other, the magnets are in a stable equilibrium position relative to each other if they are oriented perpendicular to each other as shown in FIG. 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A rotary actuator having magnetically generated haptics for an automotive vehicle, the rotary actuator comprising:
   a housing;
   a first magnet configured to be stationary in the housing, said first magnet having a first north pole and a first south pole;
   a second magnet positioned plane parallel with respect to the first magnet, said second magnet having a second north pole and a second south pole, wherein one of said poles of said first magnet is adjacent to a corresponding pole of said second magnet such that adjacent poles have the same polarity, the second magnet being configured to be rotatable with respect to the first magnet about an axis of rotation via a handle of the rotary actuator and being configured to be movable toward said first magnet when said handle is engaged in a direction parallel to said axis of rotation; and
   an air gap formed between said first and second magnets, wherein said air gap decreases when said second magnet moves towards said first magnet by pushing said handle, wherein a magnetically generated counterforce opposes a pushing force of said handle.

2. The rotary actuator according to claim 1, wherein one pole of each of said magnets is permanently turned toward the other pole of each of said magnets.

3. The rotary actuator according to claim 1, wherein the second magnet is non-rotatably linked to the handle of said rotary actuator.

4. The rotary according to claim 1, wherein the second magnet is connected to the handle of the rotary actuator via a gear.

5. The rotary actuator according to claim 1, wherein the first magnet includes a first magnetic field and the second magnet includes a second magnetic field, said first and second magnetic fields being spaced a distance from one another such that said first and second magnetic fields act upon one another without touching one another.

* * * * *